July 9, 1957 R. A. KESTER 2,798,384
SAW GRINDING MACHINE
Filed June 28, 1954 2 Sheets-Sheet 1

INVENTOR.
ROBERT A. KESTER
BY
Reynolds, Beach & Christensen
ATTORNEYS

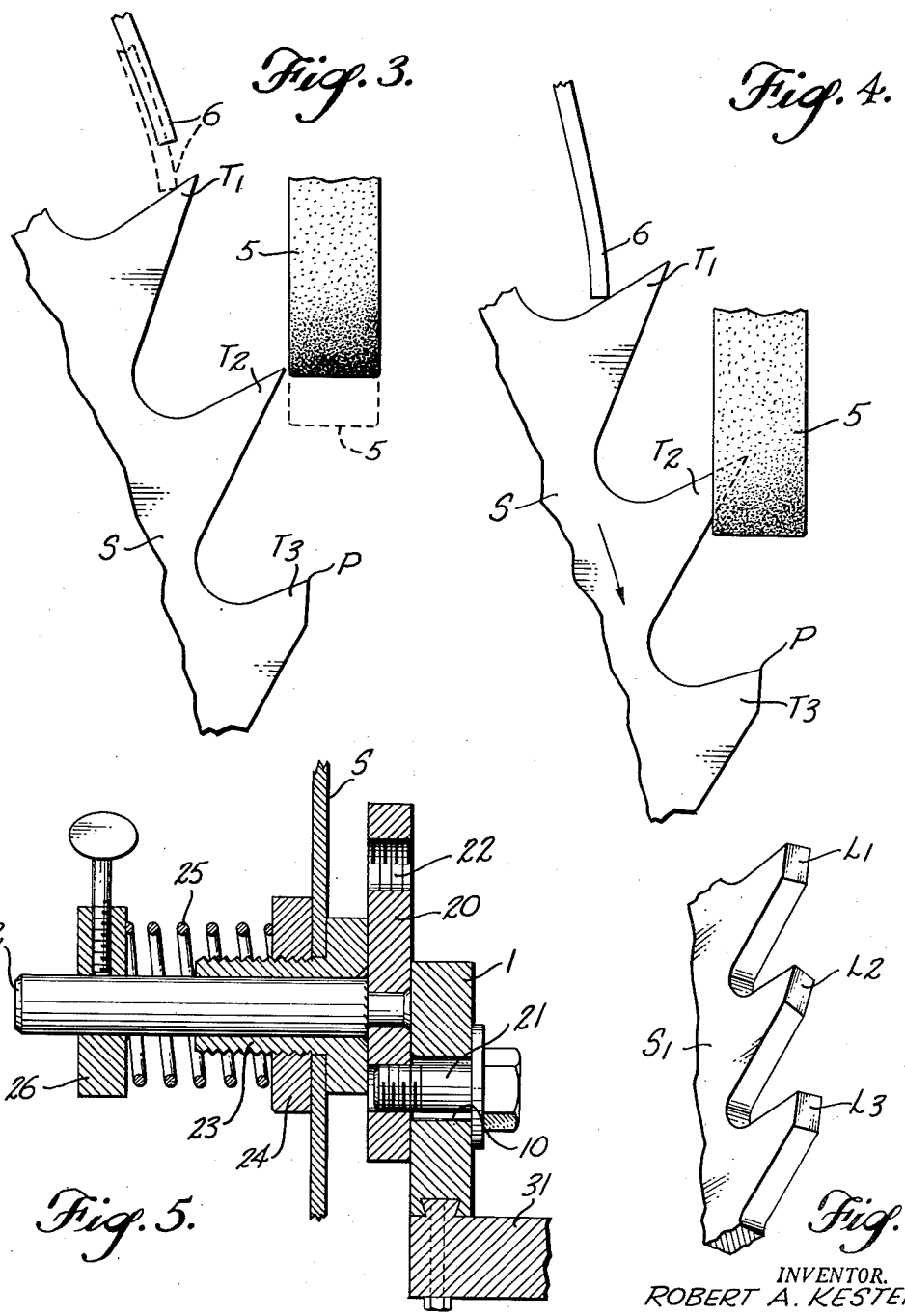

2,798,384
SAW GRINDING MACHINE

Robert A. Kester, Seattle, Wash.

Application June 28, 1954, Serial No. 439,808

5 Claims. (Cl. 76—40)

Circular saws intended for cutting hard materials, metal saws, for example, are usually formed with teeth having two edges which converge regularly and at a rather steep angle to a slender, sharp, chisel-like point, or edge. This point, having no substantial backing of metal, soon becomes dull, and the saw must be frequently resharpened, and eventually must be regummed or discarded. I have discovered that by grinding off the slender point of the tooth to provide a broad thick point, with a strong backing of metal, and having a slight clearance at its trailing edge, such a saw will retain its effectiveness for periods several times as long as a saw sharpened in the normal fashion.

It is one of the objects of this invention to provide a saw sharpening machine in the nature of an attachment for an existing saw sharpening and gumming machine of known design, such that saws may be readily, accurately and quickly sharpened thus, and may be resharpened with minimum removal of additional material.

More specifically, it is an object of the present invention to provide an attachment for a saw sharpening machine of the sort which incorporates a table vertically adjustable along an upright column, a head fixed upon the top of the column, and a tilting arm on the head whereon a side-face grinding wheel is rotatively mounted and tiltable with the tilting arm through a limited distance, the attachment involving a transverse guide mountable upon the table, and including a transversely adjustable spindle for the support of a saw in such position with relation to the grinding wheel that by pulling down the tilting arm and the grinding wheel carried thereby, the grinding wheel will grind off the tip of a tooth to the proper angle and by the proper amount, whereupon by advance of the saw through the distance of another tooth (or in a special case, by the distance of two teeth), its next tooth may be ground off, and so on until all teeth of the saw are uniformly ground. The invention includes also a ratchet pawl which constitutes an attachment which, in use, is carried by the tilting arm and engageable with a tooth of a saw on the spindle for advancing that saw by the requisite distance. Stop means limit the downward movement of the tilting arm and grinding wheel and also the downward movement of the ratchet pawl, whereby the limit of engagement between the saw tooth and the grinding wheel, hence the total amount of metal ground off, is determined for all the teeth alike.

The invention is not limited to advance of the saw by a single tooth, particularly for sharpening a saw for cutting semi-hard material, such as fiberboard, or insulating material, which requires a slicing cut. In such instance, the saw may be advanced by two teeth, and the table may be angularly adjusted relative to the plane of the saw about a center in the approximate vicinity of the point of engagement of the tooth with the saw, and in a horizontal plane, so that every second tooth is ground off along one angle, skewed with relation to its axis, and then upon reversal of the angular position of the table with respect to the plane of the saw, the intervening teeth are ground off to the opposite angle.

This invention resides in the attachment generally described above, and in the saw grinding machine incorporating such parts, and in the relationship of such parts to one another and to the parts of the saw grinding machine, all as is shown in a typical example in the accompanying drawings, and as will be more fully explained hereinafter and defined in the claims.

Figure 3 is an enlarged detail view of the relationship between the saw teeth, the ratchet pawl and the grinding wheel prior to and at the initiation of downward tilting of the tilting arm with its grinding wheel and ratchet pawl, and Figure 4 is a similar view, showing the parts in operative engagement at the completion of the downward tilting, and the consequent grinding of a tooth.

Figure 5 is a sectional view along the axis of the saw-mounting spindle, illustrating the details of a typical mount for a saw, the line of section being indicated in Figure 2 at 5—5.

Figure 6 is an isometric view illustrating several teeth of a saw ground with alternate inclination on successive teeth.

Figures 1, 2:
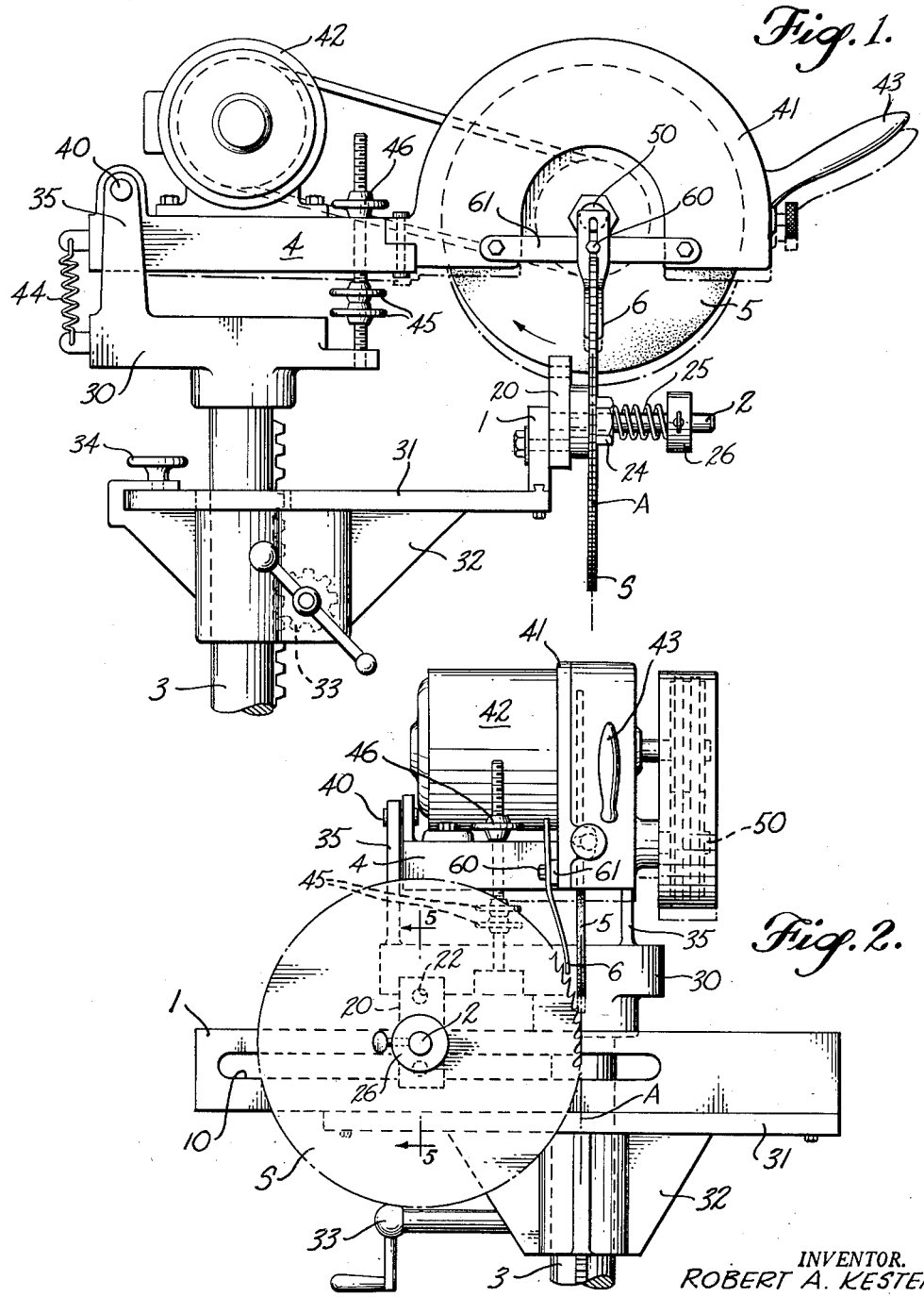
Figure 1 is a side elevational view of the saw grinding machine and attachments, with a saw in position for grinding.
Figure 2 is a front elevational view of the same set-up.

A known saw grinding machine, the Acme Circular Saw Sharpener, made by Max Manufacturing Co. of San Jose, Calif., and of the type generally as shown in Patent No. 2,590,992 to McEwan, dated April 1, 1952, includes an upright column 3, carrying a fixed head 30 at its upper end; a horizontal table 31 is supported upon a spider 32, which is adjustable vertically of the column 3 by mechanism such as that indicated at 33, and the table 31 is adjustable in its horizontal plane rotatively with respect to the spider, but about an axis indicated at A in Figures 1 and 2, all as will be more fully explained hereinafter. Clamps 34 retain the table in its adjusted position relative to the spider.

A tilting arm 4 is pivotally mounted at 40 upon a bracket 35 upstanding from the head 30. The tilting arm journals a grinding wheel 5 for rotation in a vertical plane disposed radially of the axis of the column 3. The wheel 5 is generally housed in, and is accessible by means of a swinging cover 41. It is driven by a motor 42 mounted upon the arm 4 near the latter's pivot mount. A handle 43 serves to effect tilting of the swinging end of the arm downwardly in opposition to a spring 44 which tends to retain its swinging end upraised. Adjustable stops 45 limit downward swinging of the arm to a position such as that shown in Figure 1 in dot-dash lines, and a similar stop 46 limits its upward tilting.

A machine of the nature described is known and commercially available, and is in rather general use. According to the present invention, a linear guide member 1 is mounted upon the table 31 beneath at least one side of the grinding wheel 5, directed transversely of the plane of the wheel 5 and nearly beneath its axis of rotation, indicated at 50. This guide 1 may be provided with a guide slot 10, or may be arranged in any other suitable fashion to guide a saw-mounting spindle 2 for movement transversely of the machine, that is, towards and from the plane of the wheel 5, or of its operative side face. The spindle is supported in any suitable fashion to maintain it, in the usual set-up, generally parallel to the plane of the wheel 5 but at one side thereof, and below the lowest point in the wheel's periphery. A suitable mount is shown in detail in Figure 5. A mount base 20 upon which the spindle 2 is fixedly mounted, is clamped to the guide 1 by a clamping bolt 21, passing through the slot 2 and received into one or the other of threaded holes 22 in the mount base 20, these holes being at unequal distances from the axis of the spindle for better adjustment of the position of the spindle vertically with relation to the table 31. A flanged bushing 23 constitutes a center for a saw S having an arbor aperture of given size, which is held thereon by the nut 24. The bushing 23 and the saw held thereupon is slid upon the spindle 2 against the mount base 20, and is held there by a spring 25, reacting from a set collar 26 secured upon the spindle. The bushing 23 and the saw may rotate about the spindle 2 as a center, but friction will hold them in any given rotated position. It will be understood that the particular construction described is not in itself essential to the broader phases of the present invention, but is a convenient means of mounting the saw for rotary movement, against frictional resistance, with its plane perpendicular to the plane of the grinding wheel 5, and disposed generally radially through the rotative axis 50 of the grinding wheel, as is clearly shown in Figure 1.

The saw is positioned by sliding its spindle mount base 20 along the guide 1, or by swinging the spindle about its clamping bolt 21 by a limited amount, to advance the tooth which is to be ground towards or from the near face of the grinding wheel 5, and by adjusting the spider 32 upwardly or downwardly along the column 3 to locate the saw's spindle somewhat below and to one side of the lowermost point in the periphery of the wheel 5. The plane of the saw, as has already been indicated, is disposed radially of the grinding wheel's axis. The adjustment of the saw's position should be done with care, since it has been found that the angle at which the tooth is ground off is critical; it should be a rather small angle relative to a tangent through the normal point of the tooth, the preferred angle being approximately 17 degrees.

To complete the saw grinding machine attachment, a ratchet pawl 6, preferably a piece of spring steel, is mounted upon the tilting arm 4, or in the particular machine shown, upon the cover 41 which assists in enclosing the grinding wheel 5. This ratchet pawl 6 is adjustable vertically, as indicated at 60, with relation to a mounting bar 61 which is the element directly connected to the portion of the tilting arm 4 that supports the ratchet device. The ratchet pawl 6 is so adjusted that, having regard to the size of the teeth in the saw to be ground, and whether it is desired to advance the saw by one tooth or by two with each down-tilting of the arm 4, it will engage a tooth of the saw and will rotatively advance the saw the proper amount.

Parts having been supported and adjusted as indicated above, down-tilting of the arm 4 by pressing on the handle 43 will advance the ratchet pawl and the grinding wheel 5 from the full line position of Figure 3, wherein they are out of engagement with the saw S, into the dash line position of that figure, and it will be observed that the first effect of initiation of downward movement is to engage the ratchet pawl with a tooth T1 of the saw, and to advance the lowermost point of the periphery of the wheel 5 past the point of the next tooth T2. Further downward movement into the position shown in Figure 4 advances the saw S in the direction of the arrow due to the downward pressure of the pawl 6 on the tooth T1, and continues downward movement of the grinding wheel 5. The point of the tooth T2 at an early stage comes into side face engagement with the wheel 5, and as the pressure is continued the tip of the tooth T2 is ground off until the stop 45 limits and terminates downward tilting of the arm 4. This, of course, limits and halts downward movement of the ratchet pawl 6 and the grinding wheel 5, and halts further rotative advance of the saw S. Both the saw and the grinding wheel being halted, this, then, constitutes a limit to the amount of grinding that is possible, but insures that each tooth will be ground accurately by the same amount. When the grinding of a given tooth T2 is completed, the arm 4 is permitted to rise and the ratchet pawl 6 slips beyond the tooth following T1, and upon downward pressure upon the handle 43 the tooth T1, in the same manner as before, is brought into engagement with the side face of the grinding wheel 5 and it, too, is ground off in the same fashion as the tooth T3 has been previously ground in Figures 3 and 4. This leaves a broad point P with sufficient metal backing it to give the point adequate strength, and yet the point if properly ground has sufficient clearance while the edge of the tooth is cutting.

As has been indicated, it is desirable to grind some such saws with a slight opposite inclination to the cutting edges of successive teeth so as to produce a slicing cut. Thus in Figure 6, the land L1 and the land L3 are ground off at one inclination, and the land L2 is ground at the opposite inclination. This is accomplished by rotating the table 31 about the axis A, in a manner similar to the like adjustment in the Shaw Patent No. 2,213,413, of September 3, 1940, with respect to the spider 32 so that the saw, rather than being in a plane radially coinciding with the axis 50 of the grinding wheel, is skewed at an angle to that axis. Likewise, the ratchet pawl 6 is so adjusted as to engage every second tooth. The grinding proceeds as before, downward tilting of the free end of arm 4 causes rotative advance of the saw S1 by two teeth, and engagement of the grinding wheel with the saw at an angle to the plane of the saw. Every second tooth around the saw is ground to the same inclination, after which the table 31 is adjusted to dispose the plane of the saw at the opposite inclination to the plane of the grinding wheel, whereupon the process is repeated, but grinding now the intervening teeth.

I claim as my invention:

1. In a saw grinding machine, in combination with a side-face grinding wheel, an arm whereon the same is rotatively mounted, a head whereon the arm is tiltably mounted, distant from said wheel, stop means to limit downward tilting of said arm, a spindle for rotatively mounting a circular saw, means supporting said spindle for adjustment, relative to the plane of said wheel, into a position to locate a saw, when mounted upon said spindle, with its axis somewhat below the lower limit position of the wheel and at one side of the wheel's plane, and with the circle of its teeth intersecting an extension of the plane of the near side face of the wheel, and a ratchet pawl mounted upon said arm and projecting downwardly into position to engage a saw tooth upon downward tilting of the arm, and so to advance the saw rotatively to engage the tip of a tooth with the side face of the grinding wheel, until stopped by said stop means.

2. A saw grinding machine as in claim 1, wherein the means supporting the spindle for adjustment are also arranged for angular adjustment of the spindle's axis relative to the wheel's plane, about an axis extending vertically diametrically through the wheel.

3. A saw grinding machine as in claim 1, including means to adjust the pawl relative to the arm, for engagement and advance of the saw by one or by two teeth, as desired, and in accordance with varying sizes of teeth in different saws.

4. A saw grinding machine for circular saws comprising an upright column, a head fixed upon the upper end thereof, an arm tiltably supported upon said head, stop means to limit tilting of the arm, a side-face grinding wheel rotatively mounted upon the swinging end of said arm, a table shiftable vertically upon said column, a linear guide upon said table below and directed generally parallel to the wheel's rotative axis, a saw-mounting spindle projecting in a direction generally parallel to the wheel's plane but below and offset laterally from the lowest point of the wheel's periphery, and mounted upon said guide for adjustment therealong, a ratchet pawl depending from said arm into position to engage a tooth of a saw mounted upon said spindle, and to advance such saw rotatively with downward tilting of the arm, until stopped by said stop means, the parts when in operative position moving a saw tooth, by the feed movement of the pawl, to engage its tip with the side face of the wheel.

5. An attachment for a circular saw grinding machine such as includes a tilting arm, stop means to limit its tilting, a side-face grinding wheel rotatively mounted upon the swinging end of said arm, a support generally beneath said wheel, and a saw-mounting spindle disposed generally parallel to the wheel's plane, but below and to one side of the wheel, said attachment comprising a ratchet pawl for securement upon the arm, depending therefrom into position to engage and advance rotatively a saw mounted upon said spindle, the parts being relatively arranged to advance the saw by and upon downward movement of the pawl with the arm, and thereby to engage the tip of a tooth with the wheel until stopped by the stop means.

References Cited in the file of this patent

UNITED STATES PATENTS

| | | |
|---|---|---|
| 458,205 | Wheeler | Aug. 25, 1891 |
| 502,319 | Rhodes | Aug. 1, 1893 |
| 813,910 | McClellan | Feb. 27, 1906 |
| 1,551,230 | Armstrong | Aug. 25, 1925 |
| 2,213,413 | Shaw | Sept. 3, 1940 |
| 2,431,517 | Stevens | Nov. 25, 1947 |
| 2,501,498 | Collis | Mar. 21, 1950 |
| 2,528,226 | Hildebrant | Oct. 31, 1950 |
| 2,580,812 | McEwan | Jan. 1, 1952 |
| 2,590,992 | McEwan | Apr. 1, 1952 |
| 2,607,243 | McEwan | Aug. 19, 1952 |
| 2,716,908 | Lundberg | Sept. 6, 1955 |